Oct. 5, 1954  A. D. RICHARDSON  2,691,142
GALVANOMETER COIL AND METHOD OF MAKING SAME
Filed April 28, 1950
FIG. 1.
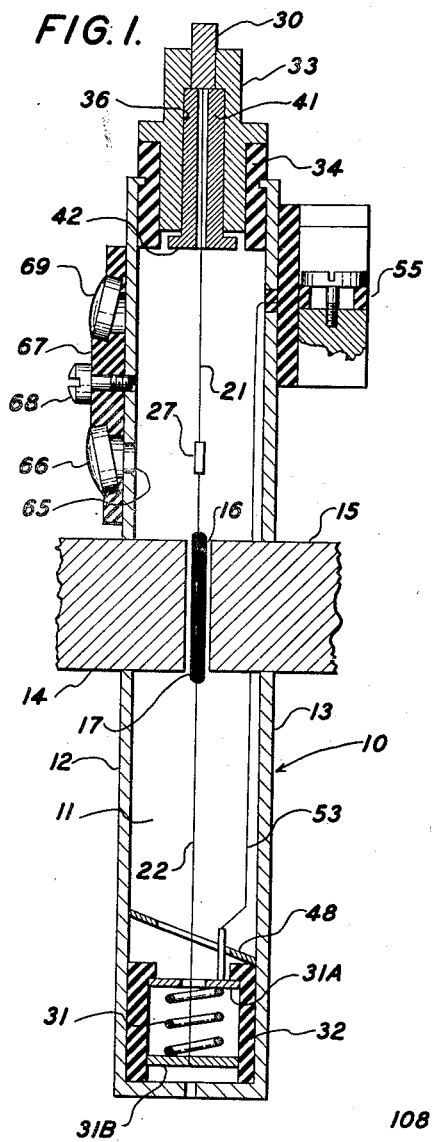
FIG. 2.
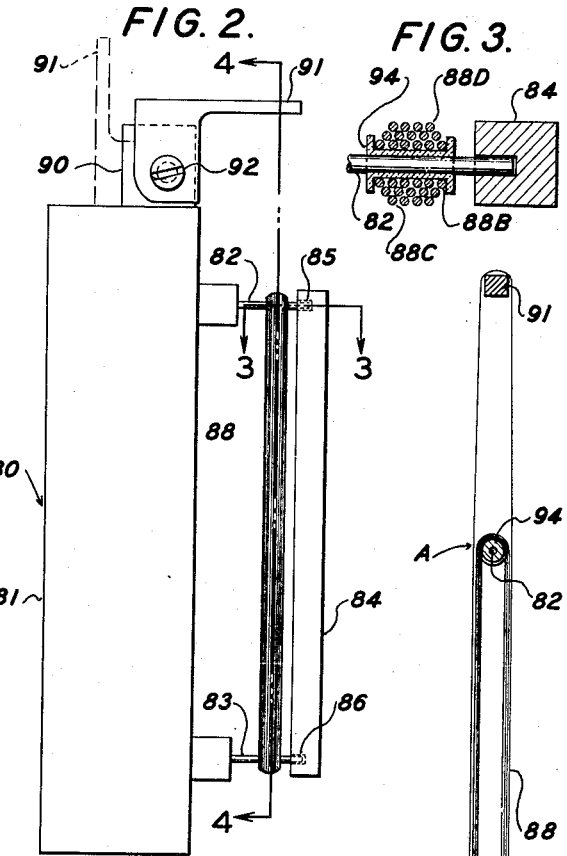
FIG. 3.
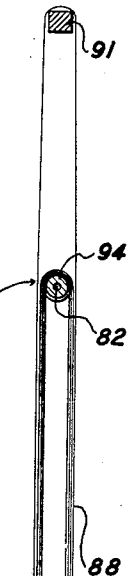
FIG. 4.
FIG. 5.
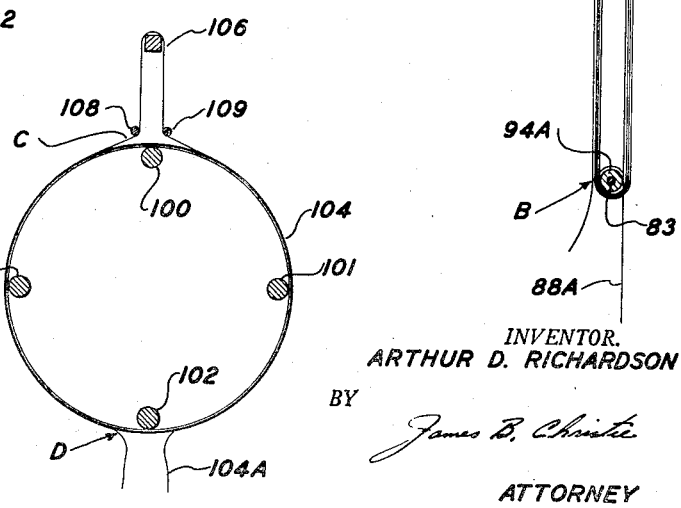
INVENTOR.
ARTHUR D. RICHARDSON
BY
James B. Christie
ATTORNEY Patented Oct. 5, 1954

2,691,142

UNITED STATES PATENT OFFICE 2,691,142

GALVANOMETER COIL AND METHOD OF MAKING SAME

Arthur D. Richardson, Pasadena, Calif., assignor to Consolidated Engineering Corporation, Pasadena, Calif., a corporation of California Application April 28, 1950, Serial No. 158,780

6 Claims. (Cl. 336—205)

This invention is concerned with galvanometers of the coil or D'Arsonval type, and more particularly to improvements in the construction thereof to improve the static balance of the instrument.

Galvanometers of this type are adapted to and are used for detecting and measuring alternating and oscillating voltages. Such galvanometers comprise a lightweight coil suspended between the poles of a magnet by means of a pair of suspension wires. The source of the oscillating voltage to be measured is connected to the coil terminals inducing coil rotation or oscillation in the magnetic field responsive to the polarity and magnitude of the voltage oscillations. A mirror attached to a coil suspension wire oscillates with the coil so that reflected rays of an incident light beam will be caused to oscillate on the surface on which they are directed.

A coil for use in such a galvanometer may comprise a fine insulated wire, such as number 48 enamel or even finer, wound as an elongated coil in such a manner that the coil is substantially cylindrical in form with a circular cross section. The several wire loops forming the coil are preferably cemented together so that the coil retains a rigid self-supporting form. Other coil shapes are used, as for example the common circular coil or the like.

For the purpose of suspending the coil within the magnetic field, the thin suspension wires are fastened to the coil at opposite ends of a diameter thereof, generally the major diameter, if the coil is cylindrical in shape. It is common practice to use these suspension wires as conductors to make the electrical connections to the moving coil, in which event the opposite ends of the wire forming the coil are connected to the opposite suspension wires. Such practice, of course, necessitates winding a half loop on the coil so that the free ends of the wire will be in position to connect with the diametrically opposite suspension wire. This fractional turn, however, results in static unbalance of the coil since the side of the coil carrying the half turn will outweigh the diametrically opposite side of the coil.

Previous attempts to overcome this unbalance have been directed to counterbalancing the coil suspension system and particularly the suspension pivot. I have now found that better ultimate balance is achieved by forming a coil which is integrally balanced, and I have further found that this integral balance can be accomplished by addition of compensating weight or weights to the coil on the side opposite the extra half turn. Accordingly, the invention contemplates in a galvanometer, a wire coil comprising a plurality of loops of wire formed from a continuous length of wire with one end of said length extending from said coil in one direction along the axis of rotation thereof, and the other end of said length extending from the coil in the opposite direction along the axis of rotation thereof, and a weight fastened to the coil on the side opposite the last half loop of said length.

In a preferred form of the invention the length of wire forming the coil is looped the requisite number of times, the last loop being severed diametrically opposite the beginning of the first loop, that is at a point opposite the point from which one end of the wire extends from the coil in the direction of the axis of rotation. This leaves a half a loop which is not connected to the remainder of the wire in the coil but which is cemented to the coil on the side opposite the last half connected loop. This expedient represents the preferred practice, since it insures that the added weight, in this case the unconnected half loop, is equal to the unbalanced weight, that is the weight of the last half loop of the coil, and is distributed along the coil substantially in the same manner as the last half connected loop.

Accordingly, the invention further contemplates a method of fabricating a wire coil for a galvanometer which comprises looping a length of wire over a plurality of guides to form a number of turns, cementing the several turns to each other, carrying the last turn over a guide spaced from said number of guides, cementing the last turn to the other turns and cutting the wire forming the last half of the last turn at opposite ends of the coil so that this last half is not electrically connected to the rest of the wire in the coil, and the wire has free ends extending from opposite ends of the coil for connection to the aforementioned suspension wires.

I have also devised a jig for making a galvanometer coil of the preferred form and in accordance with the foregoing method which comprises a body, a plurality of spindles projecting from a side of the body, the spindles being spaced from and parallel to each other, and an elongated finger pivotally mounted to the body and adapted to be rotated to project from the body in the same direction as said spindles and spaced therefrom.

The invention will be more clearly understood by reference to the following detailed description thereof taken in conjunction with the accompanying drawing wherein:

Fig. 1 is a sectional elevation of one type of galvanometer in which the invention may be practiced;

Fig. 2 is an elevation view of a coil winding jig in accordance with the invention;

Fig. 3 is an enlarged horizontal section taken on the line 3—3 of Fig. 2;

Fig. 4 is a sectional elevation taken on the line 4—4 of Fig. 2; and

Fig. 5 is a diagram of a jig for winding a different type coil.

The galvanometer shown in sectional elevation in Fig. 1 is substantially similar to the instrument described and illustrated in my co-pending application, Serial No. 673,111, filed May 29, 1946, now Patent No. 2,550,720 granted on May 1, 1951. The instrument comprises a casing 10 in the form of a square or rectangular prism, the length of which is many times longer than its cross sectional dimensions. The casing comprises an elongated back strip 11 and two side strips 12, 13. A cover (not shown) of substantially the same shape as the back 11 is adapted to be placed over the sides 12, 13 to complete the casing. There are fastened through the sides 12, 13 of the casing a pair of pole pieces which are rigidly fastened in position in the case in a suitable manner to leave a gap 16 between the two pole pieces in a central location in the case.

An elongated coil 17 is suspended in the gap 16 between the pole pieces. The coil 17 is described in greater detail with reference to the following figures of the drawing.

There is inserted inside each extremity of the coil a semi-circular member in the form of a half disk (not shown) with its straight edge at the lop of the coil. A pair of suspension wires 21, 22 are looped through the arcuate surfaces of the respective half disks (not shown) and are attached at their opposite ends to the upper and lower portion of the case. The ends of the wire forming the coil are brought out loosely and preferably are looped around respective loops of the suspension wires 21, 22. The aforementioned loops at the coil ends of the wires 21, 22 are maintained by soldering, and the ends of the wire forming the coil 17 are also soldered to the loops thereby making the suspension wires 21, 22 in effect the terminals of the coil.

A small rectangular mirror 27 is attached to the upper suspension wire 21 above the coil 17. Various means may be employed to mount the mirror 27 to the suspension wire, one such means being described in detail in the aforementioned co-pending application.

For the purpose of suspending the mirror and coil assembly centrally with the casing, a wire holding member 30 in the form of a cylindrical rod is mounted at one end of the case and has the outer end of suspension wire 21 attached thereto and at the other end of the case a compression spring 31 is retained between a pair of transverse plates 31A, 31B with the outer end of suspension wire 22 connected to the lower transverse plate 31B. The whole spring assembly is separated from the case itself by an insulator bushing 32 which is held in position at the lower end of the case by a retaining plate 48.

The tension on the suspension wires is established in this manner by the compression of the spring 31. The plate 31B is electric conducting and is effectively in circuit with the galvanometer coil. A connecting lead 53 is led through the galvanometer casing past the magnet pole pieces and through an insulating bushing 54 in side 13 of the casing into a terminal box 55. The terminal box 55 provides means for connecting one side of the oscillating voltage to be measured to the lead 53. The member 30 is retained in a bushing 33 mounted through the top of the case 10 and extending within an insulating bushing 34. The bushing 33 has a cylindrical bore 36 extending centrally therethrough. A sleeve 41 having a collar 42 on its inner end is mounted within the bore 36. The sleeve has a cylindrical shank which is adapted to slide with a tight fit in and out of the bushing 33 and is provided with a protuberance (not shown) on its inner circumference located at a central position along the longitudinal axis of the sleeve so that the wire 21 connected at one end to the rod 30 and at the other end to the coil 16 is carried over and centered by this protuberance.

When the galvanometer is assembled, the mirror 27 is located in transverse alignment with an opening 65 in the wall 12 of the case with the face of the mirror directed towards the opening so that light may be shown on the mirror through the opening and will be reflected back through the opening. A suitable lens 66 is held adjacent the opening, as for example in a lens holder 67. The lens holder is preferably rotatable about a pivot point 68 and carries a second lens 69 which may be rotated into position adjacent the opening 65 as desired.

The instrument shown in Fig. 1 is one of the many types of galvanometers employing a suspended wire coil, and in common with these many types, requires that the coil be statically balanced. Such balance is necessary for the obvious reason of attaining accurate results, any unbalance being reflected in disproportionally large or small oscillations responsive to voltages impressed across the coil.

I have found that this balance might be achieved by counter-balancing the coil itself rather than the coil suspension system, that is by weighting the coil on the side opposite the last half loop of the integral length of wire forming the coil. In a preferred form of the invention, the balancing weight comprises a length of the same wire from which the coil is formed and is incorporated in the coil during the winding thereof.

Figs. 2, 3 and 4 illustrate one form of apparatus for facilitating this winding operation. Referring to the figures, a jig 80 is used which comprises a body 81 having a pair of spindles 82, 83 extending from the side of the body and parallel to each other. A bar 84 is provided with a pair of holes 85, 86 oriented to permit the bar to be slipped over the outer ends of the spindles 82, 83. The bar is used to hold the spindles rigidly while a coil 88 is wound thereon and may be removed to allow the coil to be slipped off of the spindles. A flange 90 projects upwardly from the housing and a finger 91 is pivotally mounted to the flange with a pivot pin 92. The finger 91 may be positioned as shown in solid lines in Fig. 2, to extend outwardly from the body parallel to and in vertical alignment with the spindles 82, 83. The finger may also be pivoted to the position shown in dotted lines in Fig. 2 for the purpose hereinafter described. In winding a coil, insulating spools 94, 94A, conveniently ceramic spools (see Fig. 3), are slipped over each of the spindles 82, 83, respectively, and the coil is wound on the two spools.

The method of winding a coil to achieve the balance in accordance with preferred practice of the invention is best illustrated in Fig. 2 and in Fig. 4, which is a section taken on the line 4—4 of Fig. 2. With the necessary spools mounted over the spindles 82 and 83 and with the strengthening bar in place, the finger 91 is pivoted so that the finger projects upwardly from the body, as shown in dotted lines in Fig. 2. A length of wire 88A is then wound around the spools on the two spindles starting at the lower spindle 83 and looping over the upper spindle 82, back down to the lower spindle 83 and so on until the requisite number of turns have been provided and the free end of the wire is at the lower spindle 83 together with the leading end of the wire. The finger 91 is then pivoted to extend outwardly from the body, as shown in Fig. 2, and one more loop is formed by carrying the wire from the lower spindle 83 over the finger 91 and back to the spindle 83. As each loop or row of loops are wound, quick drying cement is applied to cement the loops together, the same practice being followed with the last loop which is carried over the finger 91. After this loop is firmly cemented to the rest of the coil, the wire is cut at A and B leaving as a free end the part of the wire extending from the spindle 82 up over the finger 91 and back to the point A. The coil 88 thus wound has a first or leading end extending from the lower spool 94A substantially coaxially with the major axis of the coil and a terminal end extending from the spool 94 substantially coaxially with the major axis of the coil and in direction opposite to that of the leading end. The length of dead wire between the points A and B is of identical or of substantially identical weight as the last half turn proceeding the terminal extending end of the wire. In this manner, there is formed an integrally and accurately balanced coil, and no means need be undertaken to counterbalance the coil suspension system which of itself is inherently balanced.

Referring to Fig. 3, which is a section taken on the line 3—3 of Fig. 2, the first turn or loop 88B is wound against the bobbin 94 and is followed by an aligned row of loops. A second and third row of loops are wound over and cemented to the first row with the last integral half turn 88C lying at one end of the outer row and the detached or balance half turn 88D lying at the opposite end of the outer row. In this way the unbalance and balance half turns are approximately opposite each other along the coil and most effective balance is achieved.

Figs. 2, 3 and 4 show the apparatus and illustrate the method of forming one type of coil in accordance with the preferred form of invention. The same technique may be used in forming any shape coil. In Fig. 5 there is shown diagrammatically apparatus for forming a circular coil in accordance with the invention, the apparatus there shown including four spindles 100, 101, 102, 103 arranged to develop a circular coil 104 when wire 104A is wrapped around the spindles. In this case there is also provided a finger 106 lying parallel to the several spindles and spaced therefrom and preferably arranged so that it may be pivoted out of the way of the spindles when the coil is being wrapped. The wire 104A is wrapped around the several spindles to give a coil of the requisite number of turns and the last turn is carried over the finger 106. After this last turn is cemented to the coil in the fashion of the other turns, it is cut approximately at the points C and D so that the length of wire between the points C and D is dead wire and so that the length of wire carried over the finger 106 to the point C constitutes a terminal and extending from the coil diametrically opposite the first or leading end of the wire, all in substantially the same fashion as described in relation to coil 88. The apparatus of Fig. 5 conveniently includes a pair of guide members 108, 109 positionable with finger 106 to facilitate winding the last loop by holding the wire forming the last loop more or less in the coil shape except as it is carried over finger 106.

The invention contemplates weighting a coil in any manner by incorporating in the coil in appropriate magnitude and position, a weight or weights to counterbalance the unbalance produced by a half or fractional turn developed in forming the coil. The method and particular coil described constitute a preferred means of accomplishing this because of its simplicity, and of even more importance because of its high accuracy. The invention is not intended to be limited to this specific type of balanced coil nor to the described method of forming this specific type of balanced coil.

I claim:

1. A method of fabricating a wire coil for a galvanometer which comprises forming the wire into a plurality of loops, forming the last loop larger than the preceding loops, cementing the several loops to each other, and cutting the wire forming the last half of the last loop approximately at opposite ends of a diameter of the coil, so that said last half of said last loop is not electrically connected to the rest of the wire in the coil, and serves as a counterweight for the other half of the last loop.

2. A method of fabricating a wire coil for a galvanometer which comprises carrying the wire over a plurality of guides to form a number of loops, cementing the several loops to each other, carrying the wire over said guides and an additional spaced guide to form a last loop larger than the preceding loops, cementing the last loop to the other loops, and cutting the wire forming the last half of the last loop at approximately opposite ends of the coil, so that said last half of said loop is not electrically connected to the rest of the wire in the coil, and serves as a counterweight for the connected first half of the last loop, and the first half of said last loop is left with a length of wire extending from the coil.

3. In a galvanometer, an integral conductive coil comprising a plurality of complete loops and a half loop disposed side by side, with one end of the coil projecting from it transverse to the axis of the loops and the other end of the coil projecting from it transverse to the axis of the loops at a diametrically opposite position, and a counterweight substantially balancing the half loop and unconnected electrically to the coil mounted rigidly on the coil opposite the half loop.

4. Apparatus according to claim 3 wherein said counterweight is distributed along the coil opposite the half loop in substantially the same weight distribution relationship to the coil as the said half loop.

5. Apparatus according to claim 3 provided with cementing means bonding together the several loops, the half loop, and the counterweight to give a semi-rigid coil.

6. Apparatus according to claim 3 wherein the coil comprises a continuous single length of wire and the counterweight comprises a length of the same kind of wire attached to and circumscribing the half circumference of the coil opposite the half loop.

References Cited in the file of this patent

UNITED STATES PATENTS

| Number | Name | Date |
|---|---|---|
| 14,969 | Ormsbee | May 27, 1856 |
| 1,379,755 | Francis | May 31, 1921 |
| 1,397,316 | Cullin | Nov. 15, 1921 |
| 1,474,402 | Caple | Nov. 20, 1923 |
| 1,633,068 | Cole | June 21, 1927 |
| 2,114,287 | Cullin | Apr. 19, 1938 |
| 2,360,835 | Kongsted | Oct. 24, 1944 |
| 2,393,037 | Fielder et al. | Jan. 15, 1946 |
| 2,404,185 | Mann | July 16, 1946 |
| 2,497,204 | Boterweg | Feb. 14, 1950 |
| 2,517,230 | Passow | Aug. 1, 1950 |